UNITED STATES PATENT OFFICE.

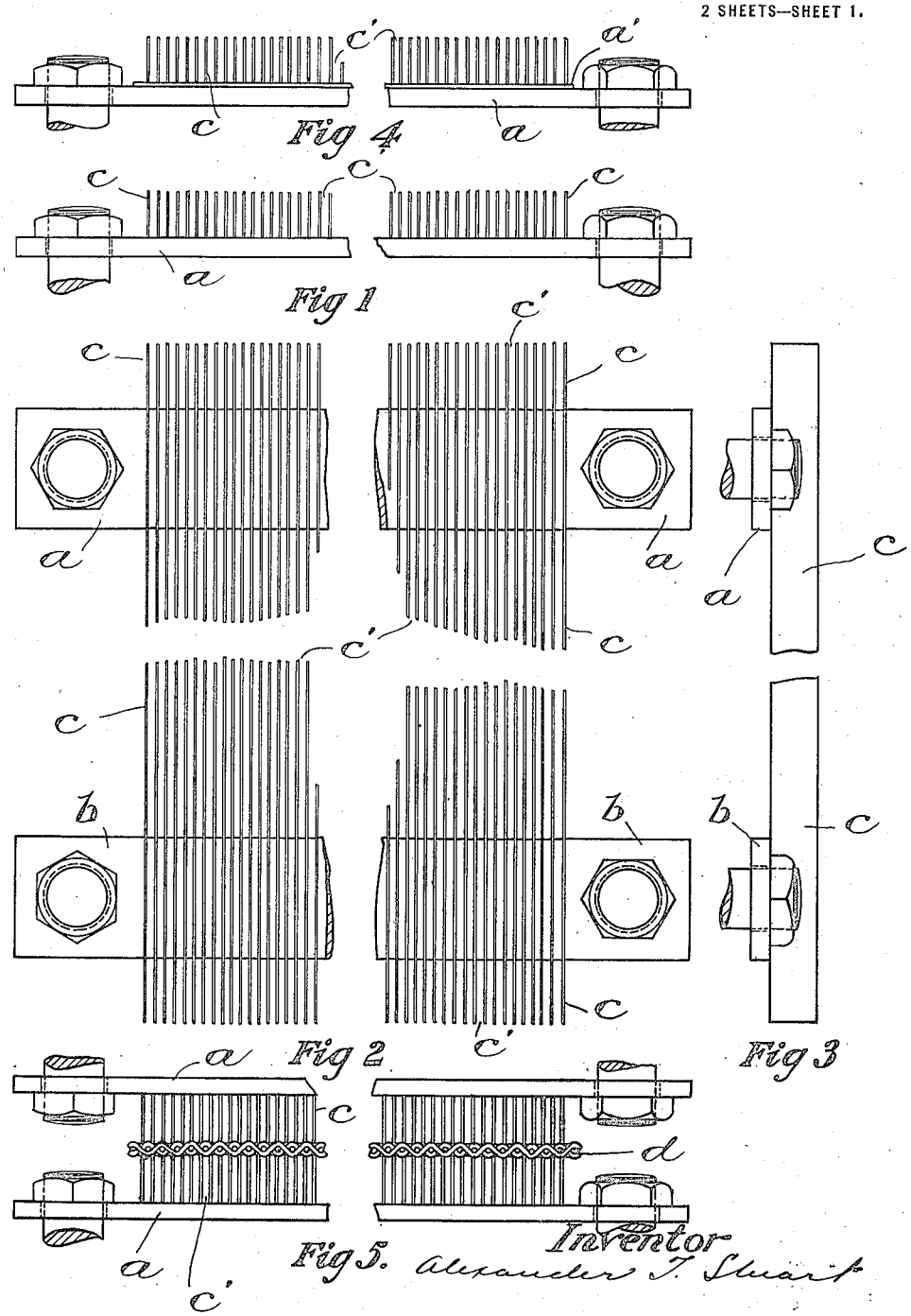

ALEXANDER THOMAS STUART, OF TORONTO, ONTARIO, CANADA, ASSIGNOR TO THE TORONTO POWER COMPANY LIMITED, OF TORONTO, ONTARIO, CANADA, A CORPORATION OF ONTARIO.

ELECTRODE.

1,269,128.  Specification of Letters Patent.  Patented June 11, 1918.

Application filed July 5, 1917. Serial No. 178,715.

*To all whom it may concern:*

Be it known that I, ALEXANDER THOMAS STUART, a subject of the King of Great Britain, residing at the city of Toronto, in the county of York and Province of Ontario, Dominion of Canada, have invented certain new and useful Improvements in Electrodes; and I hereby declare that the following is a full, clear, and exact description of the same.

This invention relates to electrodes for electrolytic and other purposes, containing new features of construction which permit of greatly increased electrical efficiency with corresponding advantageous operation of the electrolytic reaction in which they are employed.

One of the objects of the invention is to devise an electrode which has ample current-carrying capacity in its internal sectional area, with resulting low electrical losses due to internal resistance, and which will present a maximum of effective reacting surface at a minimum distance from the other reacting electrode or electrode group, with which it may constitute a reacting couple.

A further object of the invention is to provide for the offtake and removal from the zone of action of the insoluble products of electrolytic decompositions and of such gases as may be liberated, and to provide for the freedom of circulation of the electrolyte at the more active electrode surfaces.

These objects may be attained by an electrode having a multiplicity of current conducting paths interposed through and projecting into the intervening electrolyte, which is between the adjacent electrodes, constituting a reacting couple, the current conducting paths being formed by reacting structures, of any suitable geometric shape and construction, and with spaces of a greater or less width between them.

The substance composing, and used in the manufacture of the reacting structures, is preferably a metal or metallic alloy, or a metal or alloy covered with a protective deposition of any other metal or alloy on its surface, or any suitable conducting substance. These reacting structures may take the form of metal strips, arranged on current distributers, preferably conductor bars, in such a manner that the one or rear edge of each strip is in contact with the current distributer, and the width of the strip is at an appropriate angle to the surface formed by the reacting structures, any number of these strips being arranged in a row, with suitable spacing intervening between the adjacent strips, the strips being so arranged that their opposite or front edges will preferably present a uniform surface throughout the length and width of the electrode, or they may take the form of reticulated, fluted, laminated, ribbed, or projecting structures.

The current distributers are constructed of any metal or metallic alloy, and are preferably of such shape and dimensions as shall give ample mechanical strength and electrical capacity. Conducting wires, gauzes, bars, rods, plates, tubes, and the like, may be substituted for, and arranged in the same way on, the current distributers, as the current conducting strips, to effect the same purpose, and the term "reacting structures" will hereinafter be construed to include in its meaning, any conducting element or elements forming a multiplicity of current conducting paths in and through the electrolyte.

In the drawings:—

Figure 1, is a fragmentary plan of a preferred form of electrode constructed according to the present invention;

Fig. 2, is a fragmentary elevation of the same, showing the reacting surface;

Fig. 3 is a fragmentary side elevation;

Fig. 4, is a modification of the construction shown in Fig. 2;

Fig. 5, is a fragmentary plan view of an electrode group constituting a reacting couple;

The current distributer for the preferred form of electrode shown in Figs. 1, 2 and 3, may take the form of two suitably-spaced conductor bars $a$ and $b$, preferably of rectangular cross section of any desired dimensions, and made of any metal or metallic alloy, such as shall give ample mechanical strength and electrical capacity, and the reacting structures $c$ may take the form of a multiplicity of metallic conducting strips assembled on the conductor bars $a$ and $b$, so that one edge of each strip is in contact with the bars, and the width of the strip is at an appropriate angle to the surface of the bars, any number of these strips being arranged in a row with suitable spacings $c'$ intervening between them, the substance composing and used in the manufacture of the strips being preferably a metal or a metallic alloy, or a metal or alloy coated with a protective deposition of any other metal or alloy on its surface, or any other suitable conducting substance, but the current distributer may take any other convenient form or number of bars, or a plate $a'$, as shown in Fig. 4, may be placed at the back of the strips.

Figure 6:
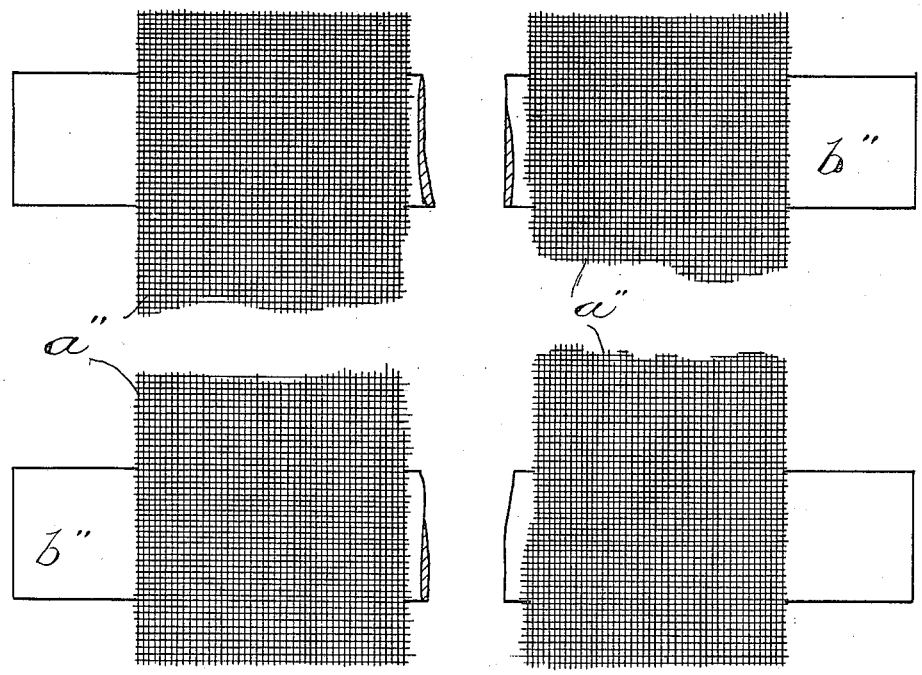
Fig. 6, is a fragmentary elevation.
Figure 7:
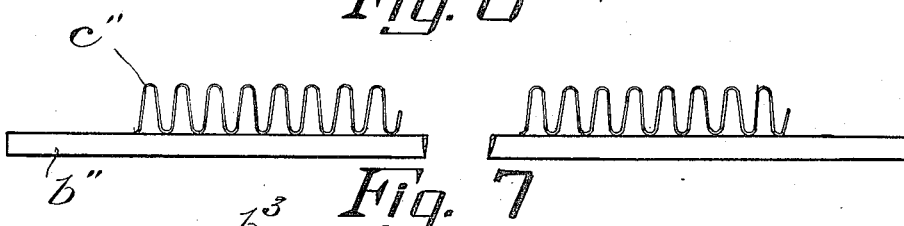
Figs. 7, 8, 9 and 10, are fragmentary plans, of modifications of the electrode shown in the preceding views.
Figure 8:
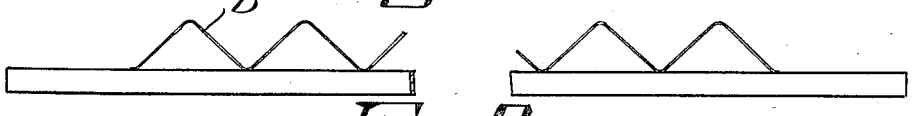
Figures 9, 10:
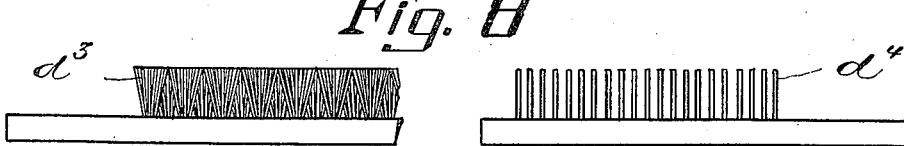

As shown in Fig. 6, the reacting structures $a''$ may be of a reticulated character, or as shown in Fig. 7, the reacting structures $c''$ may be fluted, and be integral with the current distributer $b''$, or as shown in Fig. 8, the reacting structures $b^3$ may take the form of ribs, or as shown in Figs. 9 and 10, the reacting structures $d^3$ $d^4$ may take the form of bristles or projections.

The reacting structures form the current conducting paths, and constitute the active surfaces of the electrode, and by the use of a multiple number of them, each of suitable dimensions, and arranged at appropriate angles to the current distributers, a greater unit reacting surface is obtained per unit of cross section of electrode than is possible by any other construction.

In this way, the electrode may be so proportioned as to offer a minimum electrical resistance to the passage of the necessary current.

The electrodes are operated preferably in pairs or multiples of pairs, each of such pairs consisting of an anode and cathode, with the reacting structures of opposing electrodes constituting a reacting couple, as close together as possible without touching, and the electrolyte between them, the reacting structures projecting into the intervening electrolyte. In some cases, a diaphragm $d$, see Fig. 5, may be interposed between the reacting structures of the electrode pairs, and if desired, the edges of the reacting structure may be brought into actual contact with the diaphragm, but the use of this diaphragm is not necessary in all cases. By this means it is possible to provide conducting paths through part of the electrolyte, thereby shortening the path of the current through the electrolyte itself, and lowering the resistance of the electrolyte path to a value heretofore unattainable in the practice of the art.

In an electrode so constructed, the ratio of the effective active surface to the cross sectional area has been materially increased, with the result that for a given current density per unit of cross sectional area of electrolyte, there is a much greater electrode surface for the reaction to occur than is possible with other types of electrodes, this greater reacting surface permitting of a more efficient reaction, and freedom of gas formation per unit area of such reacting surface, than is possible in the present practice of the art.

In this multiple surface construction, the channels provided by the intervening spaces, permit the electrolyte to move rapidly and freely from the vicinity of the more active surfaces, thereby preventing undue heating of that portion of it, which is between the more active surfaces, and permitting of the electrode being worked at a very much greater current density per unit of cross sectional area, and any desired temperature being maintained in the space between the electrode pairs.

As a result of the ease and efficiency of the circulation of the electrolyte, serious differences in the concentration of the anions and cations in the same electrolyte may be prevented, which will permit of a more efficient and economical electro-chemical reaction, and in some instances, permit of the matter undergoing electrolysis being electrolyzed more readily.

Gases, which may be generated at the reacting surfaces, are permitted by the intervening spaces $c'$ between the current conducting paths, to pass upward, to the back of and away from the more active fronts of the electrodes, and thus lessen the volume of the gas in the electrolyte between the more active reacting surfaces and permit of a lower resistance in the electrolyte path between adjacent pairs of reacting electrodes, than is at present possible.

This type of electrode construction not only produces the maximum of operating efficiency, and a high rate of electro-chemical reaction between the cross sectional unit of area of the electrodes, but it also provides for accessibility to the electrodes when used in cell structures, and permits of any one or more of the electrodes being readily removed and replaced.

Having thus fully described the nature of my invention, what I claim as new and desire to secure by Letters Patent, is:—

1. An electrode comprising a multiplicity of current conducting paths free at each end, forming the reacting surfaces of the electrode, such surfaces consisting of electrically connected reacting structures, with unobstructed spaces between them for the freedom of movement of the electrolyte and the electrolytic products of the reaction.

2. An electrode comprising a multiplicity of current conducting paths constituting the reacting surfaces of the electrode, with unobstructed spaces between them for the freedom of movement of the electrolyte and the electrolytic products of the reaction, and current distributers at one side of, and in electrical contact with, the current conducting paths.

3. An electrode comprising a multiplicity of current conducting paths, constituting the reacting surfaces of the electrode, arranged in parallel order with unobstructed spaces between them for the freedom of movement of the electrolyte and the electrolytic products of the reaction and current distributers at one side of, and in electrical contact with the current conducting paths.

4. An electrode comprising current distributers, a multiplicity of current conducting paths arranged at one side of the current distributers and electrically connected therewith, said current conducting paths consisting of reacting structures with unobstructed spaces between them for the freedom of the movement of the electrolyte and the electrolytic products of the reaction, the length of said structures being many times their width or diameter or thickness, such reacting structures being arranged with their adjacent sides parallel in such a manner that their lengths constitute one of the dimensions of the electrode and the sum of their thicknesses and the width of their separating spaces constitute the second dimension, and the width or depth of the reacting structures the third dimension.

5. An electrode comprising current distributers and a plurality of reacting structures consisting of metallic strips arranged on the current distributers in such a manner that the one or rear edge of each strip is in contact with the distributers and the width of the strip is at an appropriate angle to the surface formed by the reacting structures, any number of these strips being arranged in a row with spacing between them, and the front edges of the strips presenting an appropriate surface throughout the length and width of the electrode.

Toronto, June 14th, 1917.

ALEXANDER THOMAS STUART.

Signed in the presence of—
CHARLES H. RICHES,
WM. VOLKMANN.